United States Patent [19]

Betheil

[11] Patent Number: 5,181,744
[45] Date of Patent: Jan. 26, 1993

[54] PROMOTIONAL AUTO DIALER CARD

[76] Inventor: Stephen M. Betheil, 11 Deer Trail, Clarksburg, N.J. 08510

[21] Appl. No.: 670,192

[22] Filed: Mar. 15, 1991

[51] Int. Cl.⁵ .............................. B42D 15/00
[52] U.S. Cl. ...................... 283/56; 283/904; 379/355
[58] Field of Search ............ 283/56, 94, 904; 379/354, 355, 356, 357

[56] References Cited

U.S. PATENT DOCUMENTS

| | | | |
|---|---|---|---|
| 3,886,327 | 5/1975 | Dobosi | 283/94 X |
| 4,797,542 | 1/1989 | Hara | 283/904 X |
| 4,817,135 | 3/1989 | Winebaum | 379/355 |
| 4,822,990 | 4/1989 | Tamada et al. | 283/904 X |
| 4,982,073 | 1/1991 | Stenzel | 283/904 |

Primary Examiner—Timothy V. Eley
Assistant Examiner—Willmon Fridie, Jr.
Attorney, Agent, or Firm—Arthur L. Plevy

[57] ABSTRACT

A promotional device for advertising and for causing a consumer to place a telephone call to an advertiser includes a plastic card with a tone generator for generating tones for dialing a telephone, the tone generator being affixed to and preferably encapsulated within the card. The tone generator has its own battery power source and a ceramic speaker. A pressure sensitive switch actuable by finger pressure controls the tone generation and the card proximate the switch is deformable to permit switch actuation.

17 Claims, 2 Drawing Sheets

PROMOTIONAL AUTO DIALER CARD

FIELD OF THE INVENTION

The present invention relates to a promotional device, and more particularly, to a card suitable for insertion into a magazine or the like and which contains therein a tone generator for automatically dialing a telephone.

DESCRIPTION OF THE PRIOR ART

A wide variety of advertising techniques are presently available for inducing the sale of products and services. Certain forms of advertising employ transient media, e.g., a radio broadcast, whereas others use more permanent or durable media, e.g., a billboard. Some forms of advertising are only accessible in public places, e.g., store window displays, whereas others are typically accessed in private, e.g., a television commercial. Although, all advertising is, to some necessary degree, voluntary on the part of the consumer, i.e., the consumer has to voluntarily permit or participate in receiving an advertising message, in fact, the consumer has varying degrees of control over the reception of advertising messages. It might be said that certain advertising methods, such as, television advertising, are based upon the passive reception of the message by the consumer, that is, the consumer need not perform any act in order to expedite the occurrence of the commercial communication. Generally, advertising which can be effectuated upon a passive individual can usurp some degree of consumer control over it. For example, television advertising steals into the consumer's home and presents itself before the consumer can rebuff it. In order for a consumer to control television advertising, he must shake off his inertia and terminate it by an inconvenience, such as, changing channels or decreasing volume, etc. In contrast, print and certain other forms of advertising require a greater degree of participation or effort in order for the advertising message to be made, e.g., the magazine reader must turn a page, focus upon an advertisement and read it in order for the message to be transferred. The coupon user must trim the coupon from the source, take it to the store, match it with a product and present it to the cashier. The foregoing illustrates that some types of advertising are more interactive or participatory than others and require greater consumer initiative and interest to release the commercial message. These forms of advertising are also subject to greater consumer control and their effectiveness is generally based upon appeal. The present invention relates to durable, privately-accessible or "private" advertising, requiring consumer participation and under consumer control. Print advertising wherein an advertisement is placed in a circulated publication is prominent among this kind of advertising. Catalog sales and direct mail advertising have also become common and are additional examples. The practice of mailing or distributing free samples in a store or other location is yet another example. An attribute of durable, private, participatory advertising is that each individual recipient receives a physical item into their possession and control. This is the case, e.g., where a recipient comes to possess a magazine or newspaper having printed advertising therein, a mailed credit card or other mailed materials, or picks up a soap sample at the local grocery store. A physical item of this sort could be termed physical advertising media or, in certain instances, a promotional device. The most common physical advertising media is paper which bears writing or pictures thereon for conveying a message.

Paper media exhibits the generally desirable quality of being relatively inexpensive, however, the uniqueness and effectiveness of paper-based advertising relies upon the message or the image imposed thereon. As this is a well tilled field, it grows more difficult each day to generate original and distinguishable copy. Other media such as plastic are sometimes used, e.g., the unsolicited mailed credit or membership card, but, aside from the economic significance associated with an actual credit card, have a diminished capacity relative to paper to bear interesting and economical messages and images.

Occasionally, product samples are distributed to advertise a particular product. Normally, product samples are used to advertise what might be termed consumable materials, such as, soap, lotion, or foodstuffs and are relegated to advertising that product and nothing more. In addition, sample advertising is expensive and can only be employed in advertising a limited number of products which can be dispensed in samples. Much more rarely, an advertising sample is a compound operational device or is intended to interact with such a device, e.g., a floppy computer disk or a flexible plastic record.

The telephone plays a large part as a facilitator of business transactions in the modern age and also in the field of advertising. Telephones are, e.g., used to solicit business and to place orders for merchandise. Frequently, print advertisements include a telephone number to be dialed to contact the advertiser and acquire the goods advertised. This is often the case with catalogue sales, i.e., a customer desiring to purchase an item in the catalogue will call in his order. In general, it requires less effort for a customer to order by phone because the customer does not have to place his order on a written form which, by necessity, has numerous columns for quantity, product description, product codes, cost, tax, discounts, etc. Called-in orders also have the advantage of being placed with an employee who is familiar with the advertiser's products, product identification and pricing system. Thus, the order taker can immediately elicit the required information from the customer on the phone, rather than attempt to divine that information from an illegible or improperly completed order form.

The telephone has become such an often used and important facilitator of transactions in recent years that machines have been proposed for expediting use of the telephone. For example, automatic dialing machines have become commonplace. Usually, automatic dialers are discrete, programmable, microprocessor-driven apparatus having an input and operator control keypad whereby the operator introduces numbers to be called into memory and evokes the calling function when a particular number is to be called. With respect to advertising, auto dialers are sometimes used to dial a list of consumers to deliver a recorded message but beyond this limited use, the inventor herein is not aware of any other advertising use. Another type of facilitator for phone usage are methods for simplifying payment of the phone usage charge, such as, telephones adapted to provide access through telephone-readable credit cards, e.g., those of the type shown in U.S. Pat. No. 4,837,814 to Yoshino et al. entitled Telephone Set. Since cards have been developed which include therein either computer readable magnetic storage and/or a microprocessor, telephone credit cards in conjunction with telephone resident card readers have been imbued with a variety of features and functions. For example, U.S. Pat. No. 4,879,744 to Tasaki et al. entitled Card Operated Telephone discloses a card having recording media thereon for recording account value information and a telephone number that has been dialed. The Tasaki et al. card allows a suitably equipped telephone to automatically dial a telephone number previously dialed and recorded on the media resident upon the card. U.S. Pat. No. 4,868,846 to Kemppi entitled Method for Locking to the User's Card in a Portable Radio Telephone relates to use of a magnetic card "key" which permits access to the use of a radio telephone based upon knowledge of a code or possession of a card having the code recorded thereon. The card either has magnetic storage media or is a so-called "intelligent card" having a microprocessor thereon for storing/processing the secret code information. Thus it is known to store dialing, identity and account information on a plastic "credit card" either on magnetic media or in a card resident microprocessor and in conjunction with a suitable reader/dialer to initiate automatic dialing of a telephone number stored on the card.

To the inventor's knowledge, however, no advertising use is made of telephone credit cards, except perhaps to market telephone service.

It is therefore an object of the present invention to provide an advertising device that will come into the possession of consumers and will garner the interest of the consumer by its unique attributes.

It is a further object to provide an advertising device which is suitable for advertising a variety of products.

It is yet another object to provide an advertising device which is operational and which performs a function controllable by the consumer.

It is still another object to provide an apparatus for facilitating catalog sales.

It is a yet a further object to provide a self contained dialer device in the form of a credit card which may be distributed as advertising and which automatically dials an advertiser's phone number without need for telephone resident card readers or dialing equipment.

SUMMARY OF THE INVENTION

The problems and disadvantages associated with the conventional techniques and devices utilized to disseminate a commercial message to consumers are overcome by the present invention which includes a device for causing a consumer to place a telephone call to an advertiser. The device includes a card, a tone generator affixed to the card for generating tones to dial a telephone, and a control for the tone generator to permit the consumer to selectively invoke tone generation.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
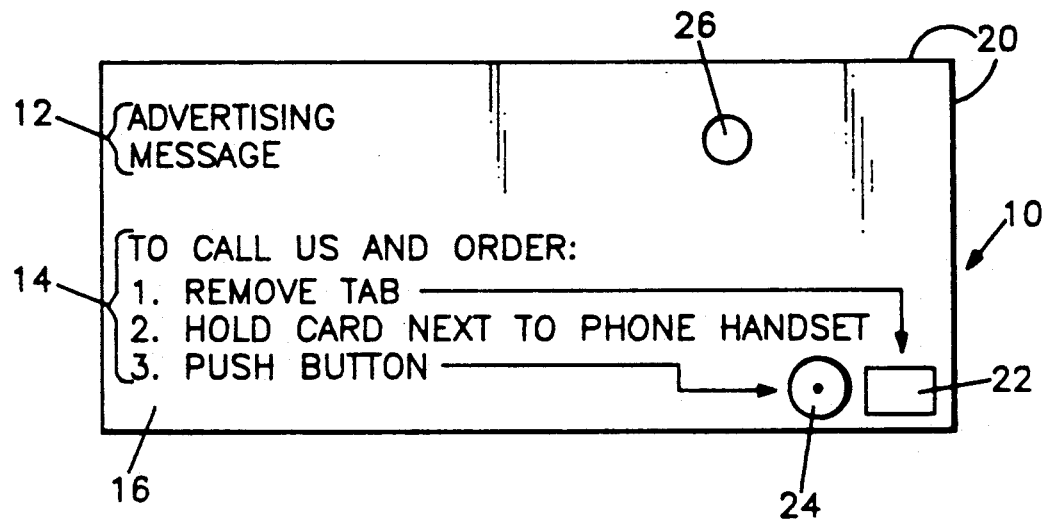
FIG. 1 is an elevational view of the front surface of a promotional device in accordance with the present invention.

FIG. 1 shows an advertising card 10 in accordance with an exemplary embodiment of the present invention. The card 10 is preferably formed from plastic or laminated paper and is in the general shape and size of a common credit card. The present invention could, however, be expressed in other shapes and dimensions, as shall be evident from the following description. The card 10 is preferably emblazoned with an advertising message 12 on some portion of the surface thereof. The message 12 permits the card to function as an independent advertising device, however, it is equally possible to use the card 10 in conjunction with other advertising media (not shown), such as, a page of printed material to which the card 10 is affixed. A principle feature of the card 10 is that it functions as an automatic, self-contained dialing device for dialing a normal telephone such as would be encountered in the homes of ordinary consumers. That is, the card 10 is intended to be used with basic phone equipment and does not require any special card reader or dialing equipment. In order to put the card 10 to that use, a set of instructions 14 are preferably imprinted on a surface of the card 10. As the card 10 is preferably a flat plate-like member it may be generally described as having a front surface 16 and a back surface 18 (see FIG. 3) as well as a peripheral edge 20. The surface of the card upon which messages are imprinted and which is facing the consumer when presented for advertising would normally be considered the front surface 16, however, both the front 16 and back 18 surfaces could bear advertising messages. Given that the card 10 can be used as an autodialer as will be explained more fully below, provision must be made for controlling the dialing function. As far as the consumer is concerned, he need only execute the instructions 14 to activate and use the device. The instructions 14 depicted refer to the removal of a tab 22 which is removably affixed to and inserted into the card 10 for the purpose of disabling the dialer function prior to use by the consumer. The tab 22 may be adhesively affixed, held by tearable perforations or merely retained by friction within the card 10. Given that the card must have an energy source with limited storage capacity, the tab 22 prevents inadvertent activation of the device during storage and shipment and prior to use by the consumer, such that the energy source is not depleted prior to its intended use. Once the card 10 is enabled or activated by removal of the tab 22, in accordance with the instructions 14, the card may then be put to use, i.e., the dialer function ma be invoked. It has been determined that a convenient method of controlling the dialer function is to provide a pressure sensitive switch within the card. The location of the switch is shown to the consumer by a figurative switch button or bulls-eye 24 imprinted upon the front surface 16 of the card 10. Since the card has an audible tone generation function, as shall be described below, and because the dialing of a phone through tone generation is made most effective by increasing the audibility of the tones, it is preferable that the card includes at least a figurative speaker outlet 26 imprinted on the front surface 16 of the card 10 to permit the consumer to position the tone source close to the microphone of a telephone handset. Alternatively, the speaker outlet 26 may be an actual outlet, such as an orifice, a collection of small orifices or a thinning or other shaping of the card in that area to render a diaphragm.

Figure 2:
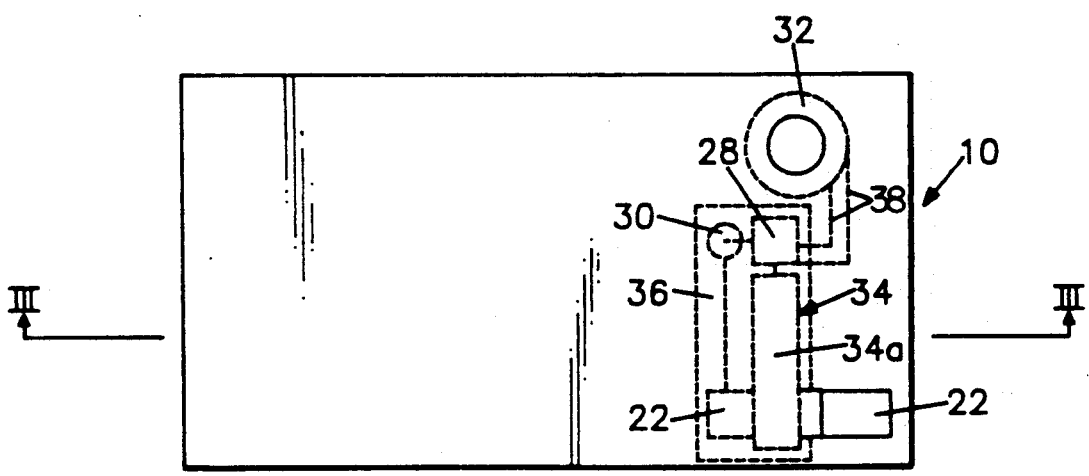
FIG. 2 is a partially phantom view of the promotional device depicted in FIG. 1 showing the interior contents of the device.

FIG. 2 shows the interior components of the card 10 which permit it to function as a telephone dialer. A tone generator 28, as is known in the art, powered by a button or wafer type battery 30 serves to generate the electrical signals required to produce audible tones from a ceramic or other small speaker 32. The tone information is stored in digital form in ROM accessible to the tone generator's microprocessor and corresponds to the tones needed to dial the advertiser's telephone. Since any number can be stored, the device can be tailored to any advertiser or to a variety of telephone numbers for different geographic locations of a single vendor. The "1-800" service offered by phone companies simplifies the selection of a telephone number to be used. As mentioned previously, a compressible switch 34 for controlling tone generation is provided and, in the embodiment shown, is a leaf-type switch, the upper leaf 34a being visible in FIG. 2. The leaf switch readily lends itself to be maintained in the "off" condition by the introduction of an insulator strip between the leaves thereof. The tab 22 is preferably constructed of plastic, cardboard or paper or some other electrical insulator and when positioned between the leaves of the switch 34 prevents assumption of an "ON" state while the device is in transit or in storage. In assembling the tone generator 28, battery 30 and speaker 26, the components may be affixed to a common printed circuit board 36 prior to encapsulizing these components in the card 10 as shall be described below, or the components may be connected by flexible connections to facilitate independent placement prior to encapsulation in the card. FIG. 2 illustrates the assembly of tone generator 28, battery 30 and switch 34 on a circuit board 36, whereas the speaker 32 is connected to the output of the tone generator 28 by flexible connections 38 and does not reside on the circuit board 36.

Figure 3:
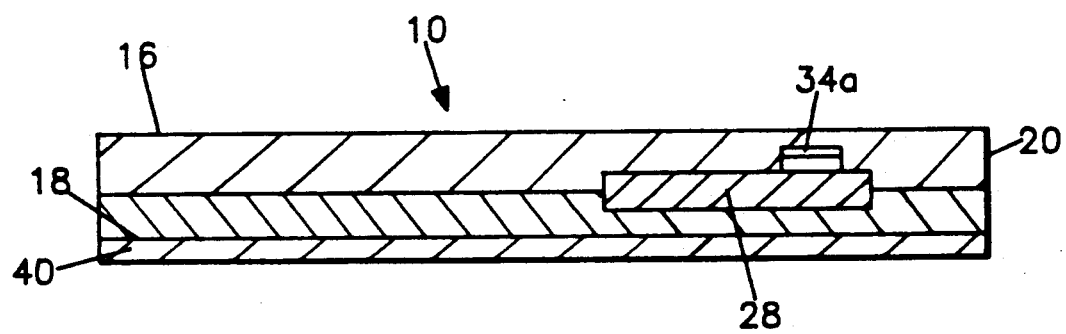
FIG. 3 is a cross-sectional view of the device shown in FIGS. 1 and 2 taken along section line III—III and looking in the direction of the arrows.

FIG. 3 shows the card 10 in cross-section. The tone generator 28 is shown in diagrammatic block form for simplicity of illustration, the details of construction of tone generators being known in the art. The moveable leaf 34a of the leaf spring switch 34 is shown spaced at a distance from the tone generator 20 and biased toward the front surface 16 of the card 10. the contacts of the switch are not shown in this view but would typically be at the extreme end of the leaf 34a. The front surface 16 of the card 10 proximate the leaf 34a must be deformable to permit the leaf 34a to be urged inwardly to close the switch 34 after the tab 22 has been removed as explained above. Alternatively, a button could project through the front surface 16 to be pressed by the consumer when he desires to make the telephone call. Since there is a great variety of switch types known in the art, the present invention is not intended to be limited to the switch type shown and could be practiced with any known switch which is flat and is relatively inexpensive to produce. The tone generator 28 and other circuit components may be encapsulated in the card 10 by providing suitable cavities in opposing halves of the card which are subsequently bonded or glued, by encapsulating the components in a card melt or by other known methods for making "smart cards". A layer of adhesive 40 may be provided on the back surface 18 of the card for holding it onto a page in a catalogue, the page of a magazine or a separate sheet of paper or cardboard. Alternatively, the magazine or catalogue page may have a layer of adhesive firmly bonded to it and the card may be less securely affixed to that, perhaps by means of a release sheet or the like. It is preferable that the bonding substance remain with the magazine, in that the rear surface 18 of the card 10 would be more aesthetically pleasing if not covered by a glue layer.

It should be appreciated that the present invention provides a durable, participatory, "high-tech" promotional device in the form of a credit card type card which automatically dials the telephone number of an advertiser. The card is controlled by the consumer and may be utilized to promote a variety of products. It should be further understood that the embodiments described herein are merely exemplary and that a person skilled in the art may make many variations and modifications without departing from the spirit and scope of the invention as defined in the appended claims.

I claim:

1. A promotional device for advertising and for causing a consumer to place a telephone call to an advertiser comprising:
   (a) a card wherein said card is a planar member having a front surface, a back surface and a peripheral edge;
   (b) a tone generator affixed to said card for generating tones for dialing
   (c) a switch means for controlling said tone generator to selectively invoke tone generation; and
   (d) a protective means for selectively protecting said switch means from inadvertent activation, said protective means being movable from a first position, wherein the activation of said switch means is prevented to a second position wherein the activation of said switching means is allowed.

2. The device of claim 1, wherein said tone generator is encapsulated within said card and includes a power source and a speaker.

3. The device of claim 2, wherein said means for controlling is encapsulated within said card and said power source is a battery.

4. The device of claim 2, wherein said switch means is a pressure sensitive switch actuable by finger pressure.

5. The device of claim 4, wherein said front surface of said card is deformable proximate said switch to permit actuation of said switch.

6. The device of claim 5, wherein said switch is a leaf switch having a contact disposed on a flexible leaf biased away from an opposing contact.

7. The device of claim 6, wherein said protective means is a removable strip of an insulator holding said leaf in a biased position and said contact and said opposing contact apart.

8. The device of claim 7, wherein said strip is interposed between said contact and said opposing contact.

9. The device of claim 3, further including advertising indicia printed on a front surface of said card.

10. The apparatus of claim 9, further including operating instructions for selectively invoking tone generation imprinted on said front surface.

11. The device of claim 8, further including advertising indicia imprinted on said front surface.

12. The device of claim 11, further including operating instructions for selectively invoking tone generation imprinted on said front surface.

13. The device of claim 12, further including figurative representations of said switch and said speaker imprinted on said front surface to permit said consumer to locate and operate said switch and said speaker in accordance with said instructions.

14. The device of claim 13, wherein said card is shaped like a credit card.

15. The device of claim 14, wherein said card is formed from plastic.

16. The device of claim 14, wherein said card is formed from laminated paper.

17. The device of claim 12, wherein said front surface has at least one orifice therein proximate said speaker for permitting sounds emanating from said speaker to exit said card.

* * * * *